United States Patent
Wu et al.

(10) Patent No.: US 8,208,183 B2
(45) Date of Patent: Jun. 26, 2012

(54) DETECTING IMAGE QUALITY DEFECTS BY MEASURING IMAGES PRINTED ON IMAGE BEARING SURFACES OF PRINTING DEVICES

(75) Inventors: Wencheng Wu, Webster, NY (US); Edul N. Dalal, Webster, NY (US); Rajinderjeet Minhas, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 831 days.

(21) Appl. No.: 12/273,643

(22) Filed: Nov. 19, 2008

(65) Prior Publication Data
US 2010/0124362 A1      May 20, 2010

(51) Int. Cl.
*H04N 1/46* (2006.01)
(52) U.S. Cl. ........ 358/504; 358/518; 347/178; 382/167; 399/39; 399/40; 399/41; 399/72
(58) Field of Classification Search ............... 358/1.9, 358/504, 518; 347/178; 399/39, 49, 40, 399/41, 72; 382/112, 167
See application file for complete search history.

(56) References Cited

U.S. PATENT DOCUMENTS

| | | | |
|---|---|---|---|
| 5,032,853 A * | 7/1991 | van Stiphout et al. | 347/116 |
| 6,240,205 B1 | 5/2001 | Fan et al. | |
| 6,347,153 B1 | 2/2002 | Triplett et al. | |
| 6,904,255 B2 | 6/2005 | Kera et al. | |
| 7,177,585 B2 | 2/2007 | Matsuzaka et al. | |
| 2005/0117928 A1 * | 6/2005 | Hino | 399/49 |
| 2006/0110009 A1 * | 5/2006 | Klassen et al. | 382/112 |
| 2006/0158703 A1 * | 7/2006 | Kisilev et al. | 358/504 |
| 2007/0140571 A1 | 6/2007 | Fan et al. | |

* cited by examiner

*Primary Examiner* — King Poon
*Assistant Examiner* — Jamares Q Washington
(74) *Attorney, Agent, or Firm* — Pillsbury Winthrop Shaw Pittman LLP

(57) ABSTRACT

Systems and methods for implementing use of customer documents in maintaining image quality or image quality consistency of printing devices are provided. The system may include a marking engine constructed to print images on an image bearing surface of the print device; one or more color measuring devices for measured toner images formed on the image bearing surface corresponding to the one or more relevant pages, and an image analyzer configured to generate reference images and to compare measured image data with the reference images. The image analyzer may also be configured to analyze input image data for a document and to identify one or more relevant pages of the document that may provide information regarding the state of the printing system to generated reference image data. Comparisons between the color separations of the reference image data and measured image data images may be realized for determining defects.

18 Claims, 9 Drawing Sheets

DETECTING IMAGE QUALITY DEFECTS BY MEASURING IMAGES PRINTED ON IMAGE BEARING SURFACES OF PRINTING DEVICES

FIELD

This application generally relates to systems and methods for detecting image quality defects by measuring images on image bearing surfaces of printing devices, and optionally correcting the one or more image quality defects.

BACKGROUND

Image rendering devices such as photocopiers, printers, facsimile machines, and other image producing devices, have been widely used in commerce and industry. Computing devices have also been widely used in commerce and industry. Higher demand for these computing devices has resulted in faster processing speeds that are sufficient for electronically detecting defects in the images rendered by image rendering devices. Detection of image quality defects ensures the production of quality images by image rendering devices.

It may be desirable to take measurements from actual customer documents. This is advantageous in that it avoids the printing of numerous test patterns that would ordinarily be required to acquire information concerning the printing device performance.

There are various existing approaches for detecting image quality defects in images rendered by image rendering devices. In order to detect image quality defects, images rendered by an image rendering device, such as a printer, are captured by an image capturing device, such as a camera, a scanner, or the like, and are compared with synthetic models of the ideal image (e.g., the electronic input image) to detect the existence of an artifact or defect in the printed image. One such system was proposed in U.S. Patent Application Publication No. 2006/0110009, herein incorporated by reference, in its entirety. Due to the full-color information required in these systems, the sensing is performed on post-fused images rather than unfused images (e.g., sensing on the photoreceptor belt or other intermediate image bearing surface). Other systems are known for sensing fused prints, such as printed sheets of paper, such as U.S. patent application Ser. No. 12/109,203, filed Apr. 24, 2008; and Ser. No. 12/018,540, filed Jan. 23, 2008, herein incorporated by reference in their entireties.

In addition, systems exist in which sensors are positioned adjacent to a photoreceptor belt or other image bearing surfaces to detect special test patches and other diagnostic patterns to monitor, diagnose and control IQ problems. One of the advantages of sensing on the photoreceptor belt is that it permits the opportunity to print and sense test-patterns in the inter-document zones (IDZs) or on the normal imaging areas of the belt without making test prints on paper. These are not visible to the customer and do not waste paper.

There are, however, limitations in sensing full color on the photoreceptor belt. For example, since unfused toner is to a large extent opaque, only the top surface can be readily sensed. As such, sensing on the photoreceptor belt can sense substantially only the top-most toner layer of the image.

SUMMARY

According to one embodiment of the application, a system configured for analyzing all or selected images printed on an image bearing surface of a printing device, the system is provided comprising: a marking system comprising: (i) a toner application system comprising at least two toner housings for applying toner to develop an unfused image on the image bearing surface corresponding to pages of the document, and (ii) a system for transferring and fusing the toner to a target media; one or more color measuring devices positioned adjacent to the image bearing surface up stream of the transferring and fusing systems and configured to measure the unfused image applied to the image bearing surface; and an image analyzer configured to process input image data and the data from the color measuring device.

According to another embodiment of the application, a method for analyzing all or selected images printed on an image bearing surface of a printing device, the method is provided comprising: applying toner from at least two toner housings to develop an unfused image on the image bearing surface corresponding to pages of the document; transferring and fusing the toner to a target media; measuring the unfused image applied to the image bearing surface; and analyzing input image data and the measuring image data.

Other objects, features, and advantages of one or more embodiments of the present disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
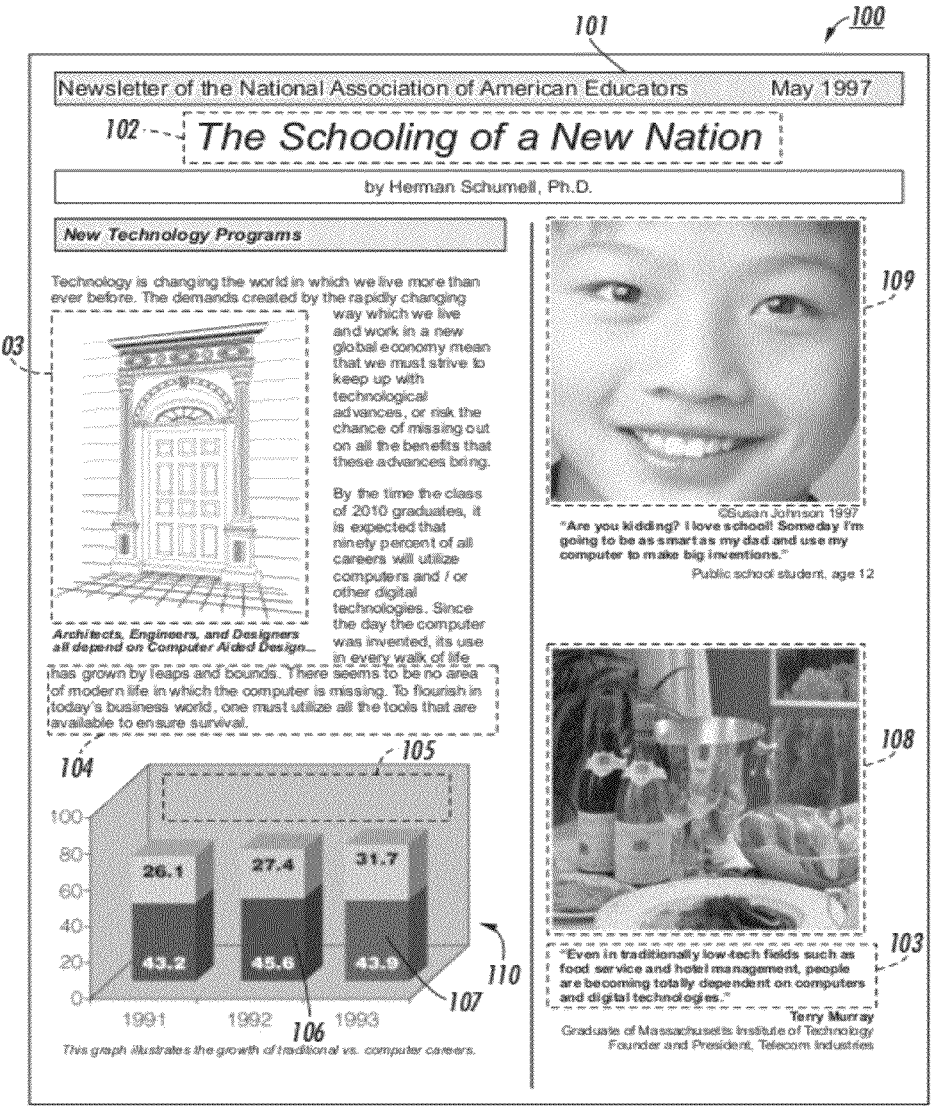
FIGS. 1-3 show examples of how knowledge of the input image data can be used to diagnose operations of a marking engine subsystem.
Figure 2:
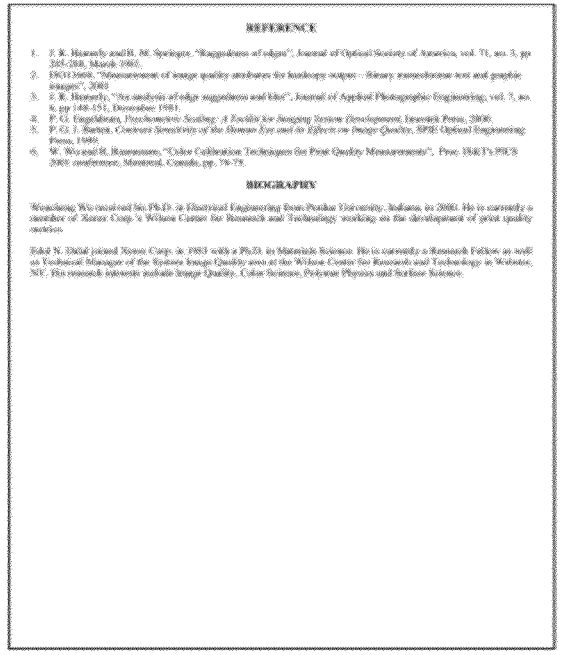
Figure 3:
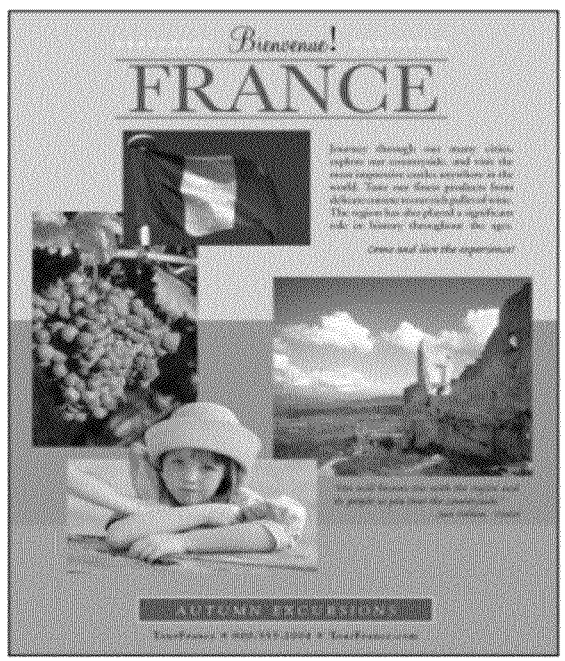

FIGS. 1-3 show examples of how knowledge of the input image data can be used to diagnose operations of a marking engine subsystem. Image data is often stored in the form of digital image data files comprising multiple scanlines, each scanline comprising multiple pixels. When processing image content, it is helpful to know the type of image represented by the content. For instance, the input image data may represent graphics, text, pictorials, or some other recognized image content type. A document of image content may be all one image content type, or some combination of different image content types.

As shown in FIG. 1 an exemplary page 100 of a document is illustrated having various image content types. For example, the page 100 may have one or more of the following image content types: black solid 101; colored text 102; black lines 103; black text 104; areas of constant halftone 105; saturated colors 106, 107; (color) halftones 108, 109; and substrate 110.

Various image content types present in the customer documents can be determined by the image analysis software using algorithms. For example, algorithms that identify the image content types of a document are disclosed in U.S. Pat. Nos. 6,240,205 B1; and 6,347,153 B1, and U.S. Patent Application Publication No. 2007/0140571 A1, herein incorporated by reference, in their entirety.

The knowledge of the image content obtained from the different image content types gathered from customer documents enables analysis of parameters from actual printed customer documents to provide diagnosis information regarding the status of the printing system. Also, the use of the various image content types present in customer images enables assessment of the various parameters achieved with the marking engine state in the printing system.

For large documents, for example, having one hundred or more pages, only a few pages of the document may be useful for extracting important information about the state of the printing device. FIGS. 2 and 3 illustrate two exemplary pages of a document. Generally, the majority of the pages of the document are mainly text, as illustrated in FIG. 2. However, a page comprising a color graphics and/or pictorial image, for example, as illustrated in FIG. 3, may also be included in the document. Thus, according to one implementation, the page shown in FIG. 2 may be used for detecting background noise, while the page shown in FIG. 3 may be advantageous for detecting color and uniformity defects.

Figure 4:
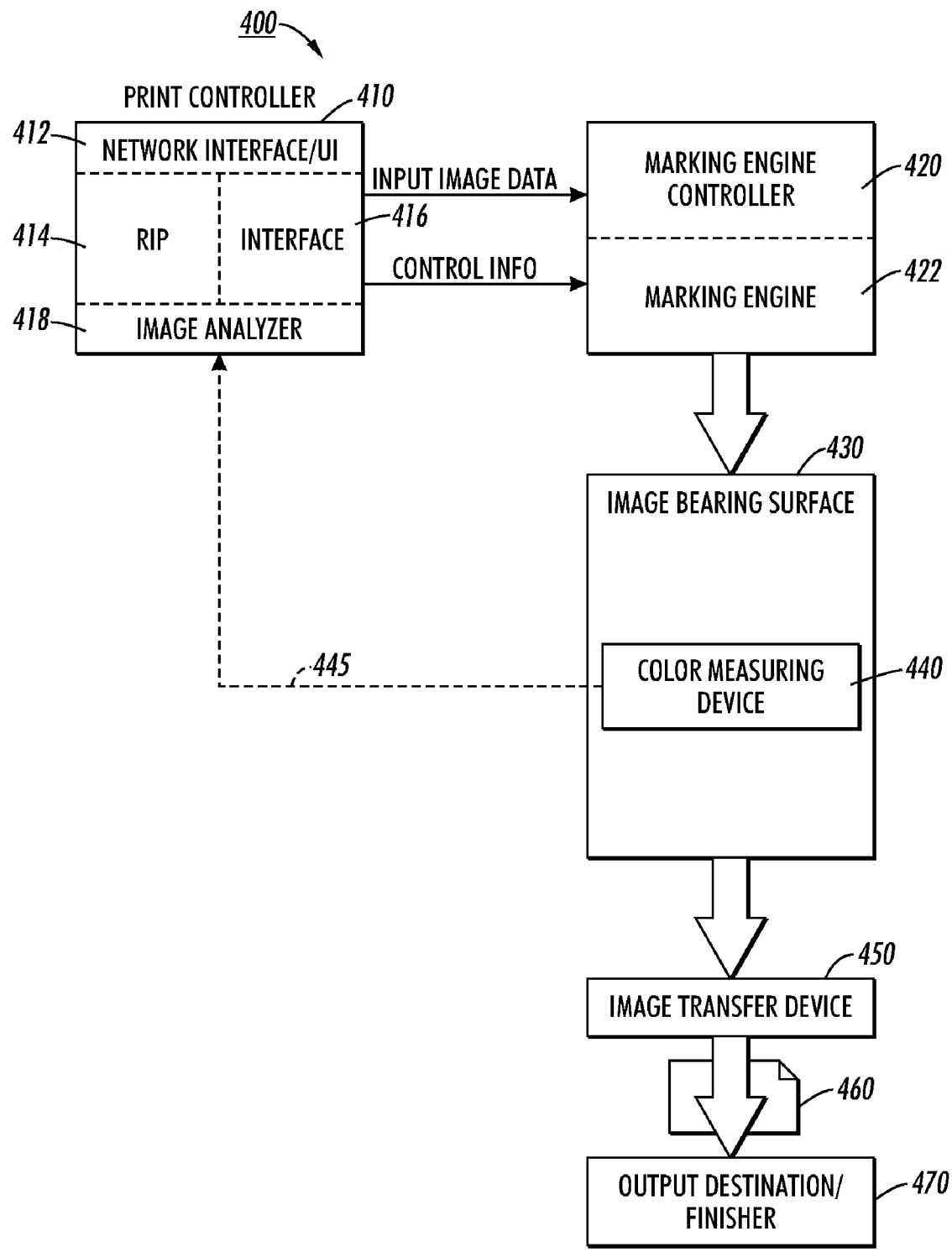
FIG. 4 illustrates an exemplary schematic for a system architecture according to an embodiment.

FIG. 4 illustrates an exemplary schematic for a system architecture 400 according to one embodiment.

Documents may be sent to a print controller 410, for example, through a network interface and/or user interface (UI) 412. The print controller 410 is used to manage print devices e.g., color laser printers, production printers, and digital presses, especially in high-volume environments. In one embodiment, the print controller 410 may be a digital front end (DFE).

Image content in digital forms (i.e., data files) is accepted, stored, produced, decomposed or otherwise presented at the print controller 410. The print controller 410 accepts content for images desired to be printed in any one of a number of possible formats, such as, for example, TIFF, JPEG, or Adobe® PostScript™. This image content is then "interpreted" or "decomposed" in a known manner into a format usable by the marking engine controller (or multiple marking engine controllers). The print controller increases productivity by efficiently automating digital workflow.

Typically, the print controller 410 is an external device, such as a computer or server, that interfaces to a network and typically will accept image content and process the image content for a copier or printer devices. However, the print controller 410 may be a part of the printing device itself. By having knowledge of each pixel individually, the print controller can process each pixel of the image content more intelligently.

The print controller 410 may receive the input image data for customer documents via a network (or alternatively/additionally through an attached scanner). The print controller 410 identifies the objects types and their locations on the customer documents that will be printed. The object types and their locations on the customer documents may be identified by the print controller 410 using image analysis software, as described above.

The print controller 410 sends both the image data from the image, and the control information to a marking engine controller 420.

The print controller 410 may include a raster image processor (RIP), 414 that accepts an input Page Description, for example, as described by a page description language (PDL), such as Adobe® PostScript™, and produces a bitmap. Generally, for graphics and text, the color representation in PostScript is 'real,' or floating point, and is represented in 32 or 64 bits. For objects that are images (e.g., a JPG file), they are generally 8 bits per color separation, but can also be 12 or 16 bits (though this is not as common). Where the PDL of the incoming image data is different from the PDL used by the printing system, a suitable conversion unit (not shown) (also referred to as a transformation unit) located in the interface unit may convert the incoming PDL to the PDL used by the digital printing system.

The bitmap is then passed to an image output terminal (IOT) interface 416. The IOT interface 416 may further perform image processing to make corrections or compensation to correct for deviations in the printing process.

The printer controller 410 also includes an image analyzer 418 which analyzes the input image data and the output image data from the color measuring device 440 to extract useful information from these image data and determines or detects whether IQ defects are present. While the image analyzer 418 is shown as being a part of the print controller 410, in some implementations, the image analyzer 418 may be separate from the print controller 410. For example, it may be part of the marking engine 420, or it may be a stand-alone component.

Figure 5:
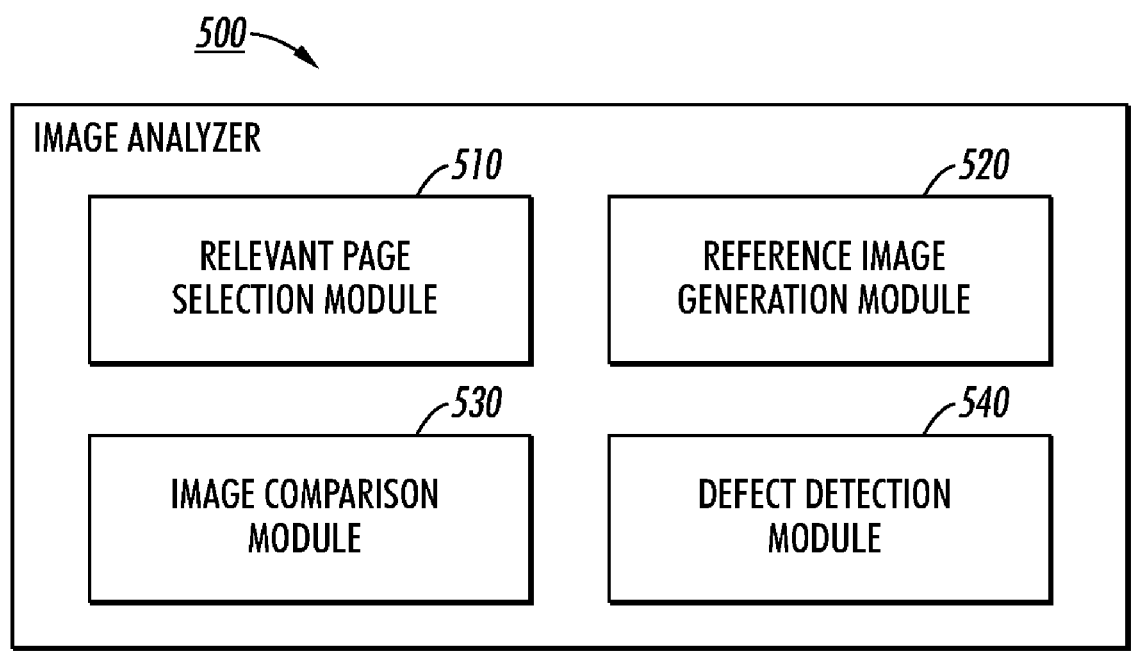
FIG. 5 shows an exemplary embodiment of the image analyzer, according to an embodiment.

FIG. 5 shows an exemplary embodiment 500 of the image analyzer 418, according to an embodiment. The image analyzer 500 consists of a reference image generation module 520 and an image comparison module 530. The image analyzer 500 may optionally further include a relevant page selection module 510 and/or a defect detection module 540. One or more modules may be combined or eliminated, and/or other modules are possible.

The exemplary embodiment 500 will be described in more detail later.

As documents are received by the print controller 410 via the Network Interface/UI 412 they are placed in queue (in memory) for printing. In the system, the extraction of useful information occurred in the image analyzer 418 includes performing a series of image and detection analyses on the input image data and the output image data from the color measuring device 440 of the customer documents, deriving the compensation signals for defects or alerting the control of printing devices for actions aiming to maintain its IQ/IQC.

The image analyzer 418 may also alert the marking engine 420 of the existence of a relevant page along with image and control information. In some implementations, the control information may include a map of that page which defines the type and location of the feature(s) of interest on the page and the page number. The image analyzer 418 may have other functions as discussed below.

The marking engine controller 420 controls one or more marking engines 422. Each marking engine 422 contains one or more image bearing surfaces 430, on which images are formed as part of the marking process. Typically, a plurality of toner housings may be provided for applying different colored toners to the image bearing surface 430 to form an image. The toner applied to the image bearing surface 430 is eventually transferred to paper and then fused. While the toner is on the image bearing surface 430 it is unfused.

As will be appreciated, the system may advantageously be used for printing systems having a single marking engine or with tightly integrated parallel printing (TIPP) systems or clustered printing systems having multiple marking engines.

The marking engine controller 420 controls the one or more marking engines 422, which are configured to form an image on an intermediate image bearing surface 430 of the printing device.

The image bearing surface 430 may include a photoreceptor belt or drum. Additionally or alternatively, the image bearing surface 430 may include intermediate transfer members of a printing device, such as, for example, disclosed in U.S. Pat. Nos. 7,177,585 and 6,904,255, herein incorporated by reference in their entirety.

The color measuring device 440 provides image scanning of customer documents without sacrificing the productivity of the marking engine. The color measuring device 440 may measure all unfused images on the image bearing surface, or just those identified as relevant pages. In one embodiment, a single color measuring device 440 is located adjacent to the image bearing surface and downstream of the last toner housing. In other embodiments, a plurality of color measuring devices 440 may be located adjacent to the image bearing surface, each downstream of a different toner housing.

The color measuring device 440 captures images of the unfused images formed on the image bearing surface corresponding to the relevant pages. For example, the color measuring device 440 may include one or more of the following: a digital scanner, full width array (FWA) sensor; or two-dimensional array sensor, such as charge-coupled device (CCD) or complimentary metal-oxide semiconductor (CMOS) scanning technology or the like.

The color measuring device 440 produces device dependent raw data such as RGB which is transmitted (or otherwise provided) to the image analyzer 418 via transmission path 445. The raw data may include data corresponding to the object types and their locations identified by the image analyzer 418.

Optionally, the device dependent raw data from the color measuring device 440 may be converted to a device independent color space such as CIE LAB before it is transmitted (or otherwise provided) to the image analyzer 418.

In one implementation, a conventional process using a complementary channel of the single-separation with a one-to-three look-up table (LUT) may be used to convert the color measuring device sensor signal (ONE) to color (THREE) such as L*, a*, b* of single-separation patches. Using the complimentary channel to measure a color may advantageously increase signal-to-noise ratio (or dynamic range). For example, if two exemplary color patches are provided—cyan 100% (toner area coverage) and cyan 90%—and only the blue channel of a color measuring device is used to measure the two cyan patches then the digital values of the two measurement would be very close and with high digital values. That is because cyan is a shade of blue. However, by using the red channel (complimentary of cyan) of the color measuring device, it is much easier to distinguish between the cyan 100% and cyan 90% test patches.

To obtain the color measurement for input image data, the following method may be used after the sensed full-channels image is registered to the relevant page:

For those eligible (e.g. non-edge) pixels that correspond to cyan, the red channel of the sensor is mapped to the L*, a*, b* via a one-to-three sensor calibration LUT predetermined by a sensor calibration procedure on cyan sweep.

Similarly, for black K and magenta M separations, the green channel may be used; and for yellow Y separation, blue channel may be used.

The color measuring device 440 is advantageously much more sensitive than the human eye and may discern non-uniformities and defects well before a person (i.e. the customer) may be capable of doing so. It will be appreciated that most characteristics and/or parameters that would be recognizable or objectionable to the customer, which may be readily determined or measured, may advantageously be measured and analyzed as well.

Once the raw image data device dependent or device independent is transmitted to the image analyzer 418, for example, via path 445, a processor associated with the image analyzer 418 may be configured for analyzing one or more image quality parameters of the printed media, such as color (e.g., CIE L*a*b color space) and color difference, reflectance at specific wavelengths, background noise, image geometries (such as image alignment, size of image, e.g., whether it has been magnified or reduced), or other non-uniformity errors, such as streaks, smudges, mottle, registration, bands, line edge noise, or other artifacts.

From this comparison, image quality defects may be determined. Exemplary correction methods-and workflow of such analyses and/or alerting mechanisms may be found, for example, in U.S. Patent Application Publication No. 2006/0110009, mentioned above.

In some implementations, the image analyzer 418 may determine not only that a certain problem exists (e.g., a certain parameter exceeds a certain threshold), but that a parameter is consistently getting worse. For example, many non-uniformities may not be currently be at the level to require action, but over time may be increasing in frequency and/or intensity. According to one aspect of the application, the history of these measurements may be maintained in a log on the machine, and/or transferred remotely so they are made available to a Customer Service Engineer (CSE) for service. As such, the image analyzer 418 may identify trends, in addition to specific defects and non-uniformities. This may trigger maintenance and/or repair action. Optionally, the system may request a reprint of any pages if a desired parameter is not achieved.

The image transfer device 450 takes the images from the image bearing surface 430 and transfers it to a substrate 460. The image transfer device 450 may be followed by a fuser device for permanently fusing the toner to the printed substrate as known in the art of xerographic printing.

The output destination/finisher 470 may include one of a plurality of output destinations, or output trays. In one embodiment, one or more of the output trays may be used as a purge tray. The output destination/finisher 470 may also perform final collating of the pages of the document. As is known in the art, the finisher can include any post-printing accessory device such as a sorter, mailbox, inserter, interposer, folder, stapler, stacker, hole puncher, collater, stitcher, binder, envelope stuffer, postage machine, or the like.

As shown in FIG. 5, an exemplary embodiment of the image analyzer 500 may include a relevant page selection module 510, a reference image generation module 520, image comparison module 530, and defect detection module 540. One or more modules may be combined, eliminated, and/or other modules are possible.

The image analyzer 500 may consist of dedicated hardware like ASICs or FPGAs, software (firmware) or a combination of dedicated hardware and software. For the different applications of the embodiments disclosed herein, the programming and/or configuration may vary.

The relevant page selection module 510 may be configured to analyze the input image data to determine relevant pages and content therein. For example, input image data may be analyzed for eligibility (see U.S. Patent Application Publication No. 2006/0110009, mentioned above) i.e. whether this page contains enough useful pixels for extracting IQ attributes.

A preliminary analysis of the input image data may be performed to determine which information, e.g., pages of the original electronic image, may be a relevant page candidate for diagnostics by eliminating various types of image data that are not considered to provide information about rendering behavior that may be useful in determining defects in the image rendered by the rendering device, e.g., a printer, to reduce or even avoid image quality defects.

For example, image data corresponding to white pages, page edges and whole pages containing fine text in at least one color space separation may not provide useful information about the printer's behavior. When trying to register the original electronic images and the corresponding reference images, the largest error may be found at edges. These edges may include page edges and fine text that is formed of edges where any small misalignment may appear as a printing error when the problem is really that of misalignment. Because the alignment of the page edges and fine text can be difficult to process correctly, ignoring such information may be beneficial. It may also desirable to measure only those images having a minimum coverage area greater than a predetermined threshold value and sufficient distinct features to allow registration. A preliminary analysis to identify pages that are not considered useful for measuring reduces processing time and communications bandwidth by not subsequently measuring all unfused images.

In other words, if a page of the original image contains regions that are not sufficiently large to be useful and/or contain too many edges, then it may be desirable to skip that page. Although the preliminary analysis of the original image data is optional, measured information is presumably communicated along a wire to perform further processing (unless processing is performed on a scan bar). Therefore, the preliminary analysis to identify pages that are not considered useful for measuring reduces processing time and communications bandwidth by not subsequently measuring all unfused images.

The reference image generation module 520 may be configured to generate reference image data of each of the color-separations of the input image data corresponding to the relevant page. The relevant page image data R includes the raw input data from each of the color-separation, $R_C$, $R_M$, $R_Y$, $R_K$.

In one embodiment, the reference image generator module 520 may be configured to infer reference image data based on input image data, the sequence of toner housings, and the location of color measurement devices. The order of the toner housings is important for generating the reference image data of each color separation for relevant page image data R. According to an aspect of the application, reference image data I may be generated for each of the colors of the toner housings used to form the toner image on the image bearing surface.

The reference image generation module 520 looks at each of the color separations one-by-one starting first with the color of the last toner housing relative to the color measuring device. Since this color is formed last on the image bearing surface (i.e., it is the top layer), it would not be covered or otherwise negatively impacted by other toner colors. Thus, the generated reference image data of the color separation for the color of the last toner housing may be substantially the same as the raw data from the input image data for that color for all locations on the image bearing surface.

The reference image generation module 520 may then look at the color of the second to last toner housing relative to the color measuring device. The previous toner color, however, may cover portions of the toner of this color on the image bearing surface. Thus, raw data for this color separation cannot be accurately measured with the color measuring device. According to an aspect of this application, sensing of this color separation at these locations may be suppressed, for example fully or partially. Thus, in some implementations, the generated reference color separation data for color of the second to last housing may include the raw data from the input image data for locations on the image bearing surface that would not be expected to be covered by toner of the previous color housing.

For example, in one implementation (shown in FIG. 6), the toner housings may be provided adjacent to the image bearing surface in the following order: magenta ($1^{st}$), yellow ($2^{nd}$), cyan ($3^{rd}$), and black ($4^{th}$). Locations on the image bearing surface may be defined according to the x- and y-positions.

Accordingly, the color separations data of the generated reference image I corresponding to the relevant page may be determined using a series of "AND" ($\cap$) and "NOT" ($\sim$) operations with a correction term as follows:

1. All black (K) pixels, which correspond to the last toner housing may be determined, as follows:

$$I_K(x, y) = R_K(x, y) + f(R_C(x, y), R_Y(x, y), R_M(x, y))$$
$$= 0 \text{ if } R_K(x, y) = 0$$

The black pixels may be modified by a correction function $f(\cdot)$ based on the likely impact of the cyan, yellow and magenta toners underneath.

2. All cyan (C) pixels, which correspond to the second to last housing, may be determined, as follows:

$$I_C(x, y) = R_C(x, y) \cap \sim R_K(x, y) + g(R_Y(x, y), R_M(x, y))$$
$$= 0 \text{ if } R_C(x, y) \cap \sim R_K(x, y) = 0$$

The cyan pixels which are not expected to be covered by the black toner when forming an image corresponding to the relevant image on the image bearing surface may be modified by a correction function $g(\cdot)$ based on the likely impact of the yellow and magenta toners underneath.

3. All yellow (Y) pixels, which correspond to the third to last housing, may be determined, as follows:

$$I_Y(x, y) = R_Y(x, y) \cap \sim R_K(x, y) \cap \sim R_C(x, y) + h(R_M(x, y))$$
$$= 0 \text{ if } R_Y(x, y) \cap \sim R_K(x, y) \cap \sim R_C(x, y) = 0$$

The yellow pixels which are not expected to be covered by the black or cyan toner when forming an image corresponding to the relevant image on the image bearing surface may be modified by a correction function $h(\cdot)$ based on the likely impact of the magenta toner underneath.

4. All magenta (M) pixels, which correspond to the fourth to last housing, may be determined, as follows:

$$I_M(x,y)=R_M(x,y)\cap \sim R_K(x,y)\cap \sim R_C(x,y)\cap \sim R_Y(x,y)$$

The magenta pixels may be defined as the remaining pixels which are not expected to be covered by the black, cyan or yellow toner.

As indicated above, the color separations data may be modified by one or more correction functions. If the top toner layer is completely opaque, the correction functions $f(\bullet),g(\bullet),h(\bullet)$ may be assumed to be all zero (0). However, when the opacity is not complete, the correction functions may use fractional contributions of the bottom layers, so as to modify the color separation data, for example:

$$f(R_C(x,y), R_Y(x,y), R_M(x,y))=aR_C(x,y)+bR_Y(x,y)+cR_M(x,y),$$

$$g(R_Y(x,y),R_M(x,y))=aR_Y(x,y)+bR_M(x,y) \text{ and}$$

$$h(R_M(x,y))=aR_M(x,y), \text{ where } |a|<1, |b|<1, \& |c|<1.$$

In one embodiment, the correction functions $f(\bullet),g(\bullet),h(\bullet)$ may be determined by offline experiments via imaging and measuring on the image bearing surface a set of test patches of pre-determined CMYK combinations. Other empirical methods and modeling are also possible.

The reference image I for a relevant page may be defined as the combination of $I_C, I_M, I_Y, I_K$.

Some fidelity of the color data for the reference image I may unfortunately be lost, especially for pixels for colors of the toners from the housings furthest from the color measuring device. As noted above, this may occur because toner from other housings (closer to the color measuring device) may be expected to cover the toner from these housings (further away from the sensor). Nonetheless, the information that may be determined by this methodology can still provide important information regarding the state of the printing device. Comparisons may still be made on a color-by-color basis.

The image comparison module 530 may be configured to compare the generated reference image of each color-separation of each relevant page with the corresponding output image data from the color measuring device of each color-separation of each relevant page that is rendered on the image bearing surface.

For each color separation, a comparison may be made between the image data for the reference image and its corresponding output image from the color measuring device. For example, the black pixels (K) are compared, the cyan pixels (C) are compared, the yellow pixels (Y) are compared; and the magenta (M) pixels are compared. If more or less process colors are used (e.g., beyond 4-color CMYK printing), each color separation may similarly be compared in this manner.

In one embodiment, differences between the reference image data and the measured unfused image data at all pixels are determined.

In another embodiment, differences between the reference image data and the measured unfused image data only at some pixel locations are determined. For example, differences may be determined only for each of the regions of interest that contain information that is useful in determining image quality errors in images rendered by a printing device.

One example embodiment to determine the regions of interest is to create a correction mask which excludes pixels that are labeled as 0 while keeping those that are labeled as 1. For example, if a pixel is too close to edges, it may be labeled as 0 since it may be less suitable for comparison. For another example, if a pixel is part of a uniform large area, it may be more suitable for comparison and thus may be labeled as 1.

For example, a determination of the correction mask is made depending on whether a pixel of the relevant page corresponds to a horizontal edge and/or a vertical edge, if values associated with the pixel are greater than a predetermined threshold value. Thus, a corresponding pixel location of a correction mask may be set to a false value (0). Although the false value (0) is set when either a horizontal edge value or a vertical edge value is greater than a predetermined threshold value, the corresponding pixel location may be set to the false value (0), indicating an edge, if a sum of the values associated with the pixel is greater than a predetermined value. Otherwise, a corresponding pixel location of a correction mask may be set to a true value (1).

Edges may be identified by any known or hereafter developed edge detection method or device such as Sobel edge detection filters. For example, weights in an X-filter and a Y-filter are applied to a given pixel, of an original image, having a 3×3 neighborhood of pixels. The weights of the X-filter and the Y-filter may be represented as follows:

| X-filter: | −1 | −2 | −1 | Y-filter: | −1 | 0 | 1 |
|---|---|---|---|---|---|---|---|
| | 0 | 0 | 0 | | −2 | 0 | 2 |
| | 1 | 2 | 1 | | −1 | 0 | 1 |

Based on relative weighted values of the neighboring pixels, the existence of an edge at the given pixel may be detected. For example, an associated input intensity value is multiplied by a respective weight in the X-filter for each of the respective pixels. Then, a sum of the weighted values is compared to a threshold value to determine if a horizontal edge exists. If the sum is above the threshold value, e.g., a positive or negative value that is far from zero (0), then the given pixel is identified as a region containing horizontal edge content. If all pixels in the neighborhood of the given pixel are equal, i.e. the sum substantially equals zero, then the given pixel is identified as a region with little or no edge content. Then, the above process is performed using the Y-filter to identify the given pixel as a region containing vertical edge content. The X-filter and the Y-filter are applied to each pixel of at least the original image.

Once the existence of edge content has been determined, for each pixel of the original image, the sum of the X-filter or the Y-filter, either alone or combined, is compared to a predetermined threshold value or range to determine whether the pixel has too much, none or little edge content. For pixels having too much edge content, a corresponding pixel location in a correction mask is set as false (0) to indicate that the respective pixel contains information that is not useful in determining image quality errors in the rendering device. For the pixels that are not within the predetermined threshold value or range, a corresponding pixel location in the correction mask is set as true (1) to indicate that the respective pixel contains information that is useful in determining image quality errors in the rendering device.

A correction mask may be determined for the pixels of the reference image only, or a correction mask may be determined for the pixels of both the reference image and its corresponding measured unfused image. If a correction mask is to be determined for pixels in the original image only, then edge detection is performed for the original image only, and error detection is subsequently performed based on the correction mask for the original image.

It will be appreciated that any type of edge, e.g., a diagonal edge having a middle value for both the X-filter and the Y-filter, may also be detected to determine the regions of interest. Further, it should be appreciated that the predetermined threshold value may include a range of values for which detected edges may be indicated as regions of interest.

In the examples cited above, pixels close to edges may be discarded (i.e., labeled 0) because edges are disruptive to the evaluation of many image quality attributes such as uniformity. However, some image quality attributes, such as registration, require the use of edges. Consequently, when evaluating image quality attributes such as registration, pixels close to edges may be retained (i.e., labeled 1) while pixels away from edges may be discarded (i.e., labeled 0).

In one implementation, when comparing measured output image data with the reference image on a pixel-by-pixel basis only at the region of interest, the difference may be assumed to be zero (0) everywhere that the correction mask is a false value (0). Because calculation is unnecessary except where the correction mask is a non-zero true value (1), a difference in input intensities may be determined only in the identified regions of interest, e.g., at corresponding pixel locations where the correction mask is set to a true value (1).

The defect detection module 540 may be configured to determine one or more IQ defects and optionally provide remedial action.

Printed errors or defects may be categorized, for example, into the following categories or groups, for example: streaks, e.g., horizontal streaks substantially across the entire page, bands, e.g., vertical streaks substantially across the entire page, and blotches, e.g., errors that are neither horizontal nor vertical streaks.

The difference between image data for the measured unfused image data (i.e., related to what was actually printed and measured) and the reference image data (i.e., what should have been measured) may be used for various purposes. For example, it may be used for modifying the process controls parameters of the marking engine 422 to compensate for variations and inconsistencies in the output image, and/or to generate error signals. In some implementations, the process controls parameters of the marking engine 422 may be automatically adjusted to compensate for variations and inconsistencies in the output image.

According to an aspect of the application, a system is provided which tracks and detects single-separation image quality attributes by sensing images on an image bearing surface. The proposed method can operate on the image bearing surface, by utilizing a modification of the reference image on the image bearing surface to simulate the unfused toner. This permits sensing of printed documents, without test patterns, using actual customer images, in a manner invisible to the customer and without wasting toner, paper and/or press time.

For each page, input color separations data for each process (toner) color (e.g., CMYK) may be readily available from the input image data. The print controller 410 may provide input image data to the image analyzer for processing.

Figure 6:
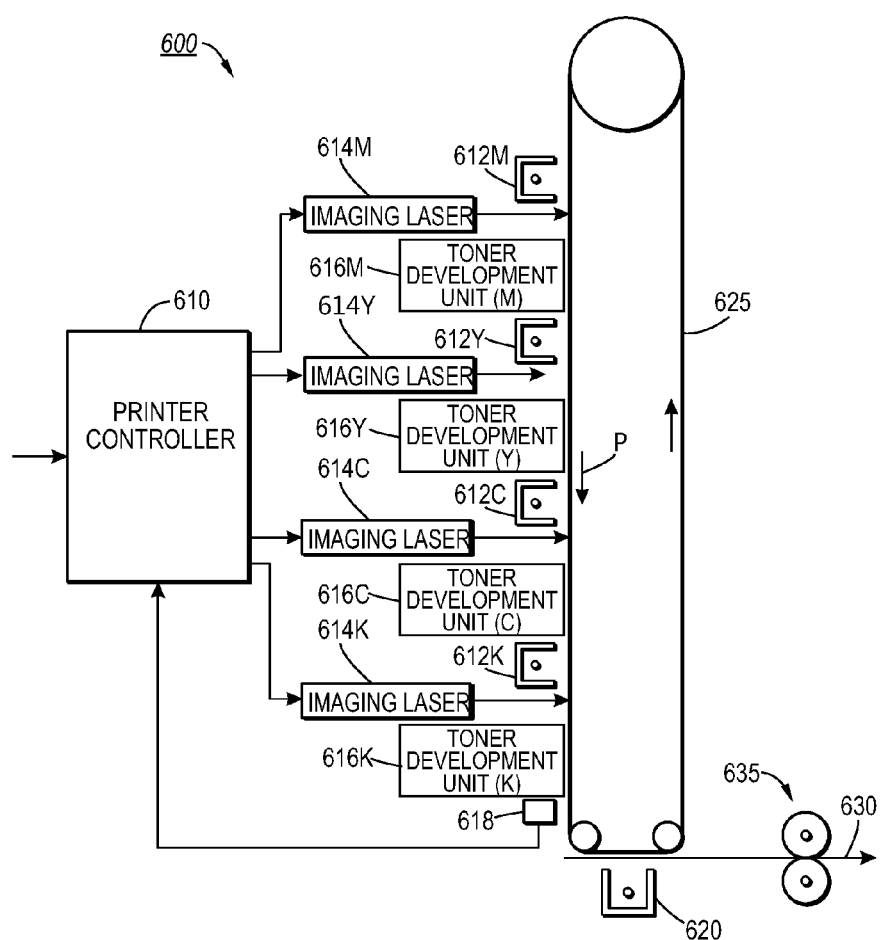
FIG. 6 shows an exemplary printing system, according to an embodiment.

FIG. 6 shows an exemplary printing system, according to an embodiment.

Specifically, there is shown an "image-on-image" xerographic color printer, in which successive primary-color images are accumulated on a photoreceptor belt, and the accumulated superimposed images are in one step directly transferred to an output substrate as a full-color image. In one implementation, the Xerox® iGen4® digital printing press may be utilized.

However, it is appreciated that other printing machines, such as color printing machines using any technology, xerographic machines having intermediate transfer members and/or multiple photoreceptors, can beneficially utilize the present disclosure as well.

Specifically, the FIG. 6 embodiment may include a belt photoreceptor 625, along which are disposed a series of stations, as is generally familiar in the art of xerography, one set for each primary color to be rendered (or printed).

For instance, to place a cyan color separation image on photoreceptor 625, there is used a charge corotron 612C, an imaging laser 614C, and a toner development unit 616C, which may be referred to as a "toner housing." For successive color separations, there is provided equivalent elements 612M, 614M, 616M (for magenta), 612Y, 614Y, 616Y (for yellow), and 612K, 614K, 616K (for black). The successive color separations are built up in a superimposed manner on the surface of photoreceptor 625, and then the combined full-color image may be transferred at transfer station 620 to an output sheet 630. The output sheet 630 is then run through a fuser 635, as is familiar in xerography. Printing process may be controlled, for example, by a print controller 610.

As is familiar in the art of "laser printing," by coordinating the modulation of the various lasers with the motion of photoreceptor 625 and other hardware (such as rotating mirrors, etc., not shown), the lasers discharge areas on photoreceptor 625 to create the desired printing, particularly after these areas are developed by their respective development units 616C, 616M, 616Y, 616K.

In one implementation, a color sensing device 618 may be placed adjacent to the image bearing surface and downstream of the black (K) toner housing 616K. As shown, the sensor 618 may be provided adjacent to image bearing surface after the final toner housing, but before the image transfer and fuser device 620.

While the order of the housings, for example, in FIG. 6 is magenta ($1^{st}$), yellow ($2^{nd}$), cyan ($3^{rd}$), and black ($4^{th}$)—in the process direction P, it will be appreciated that the toner housings may be ordered in other sequences and with additional or fewer colors. This may of course change the color separation generating algorithms discussion herein.

Figure 7:
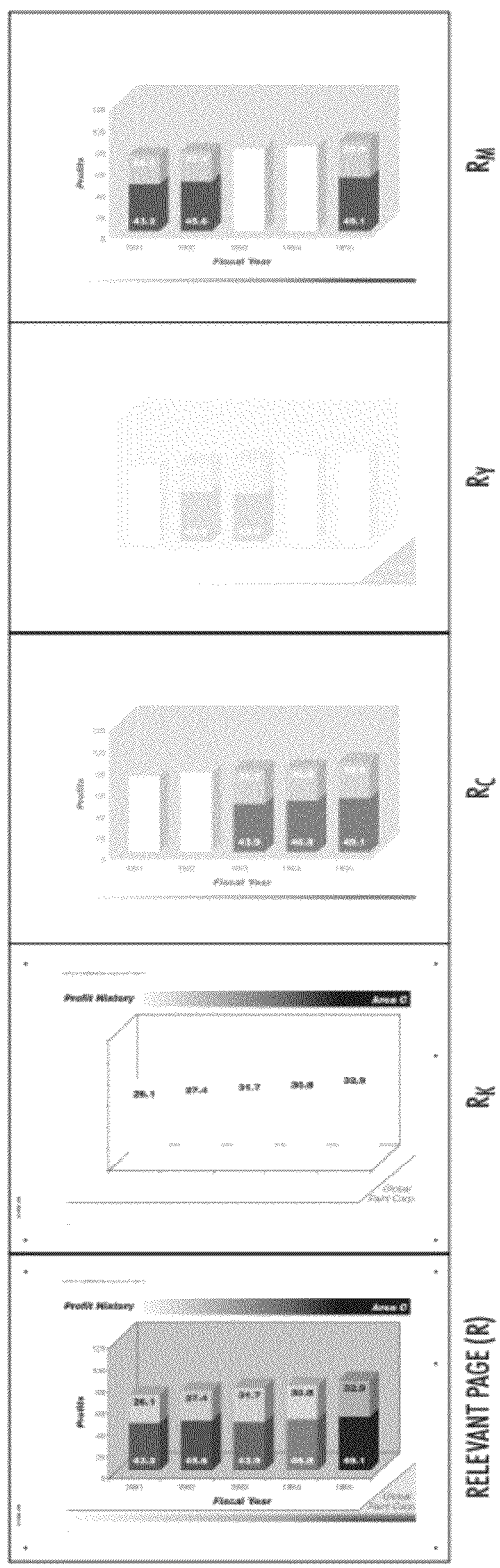
FIG. 7 shows the overall and individual input color separations data for an exemplary relevant page on the image bearing surface, according to an embodiment.

FIG. 7 shows the overall and individual input color separations data present on the image bearing surface for an exemplary relevant page, according to an embodiment. It shows the input image data for a relevant page R, which may be defined as the combination of the input image data of each of the color separations $R_C, R_M, R_Y, R_K$. Each of the input image data of each color separation correspond to one of the toner housings shown in FIG. 6.

Figure 8:
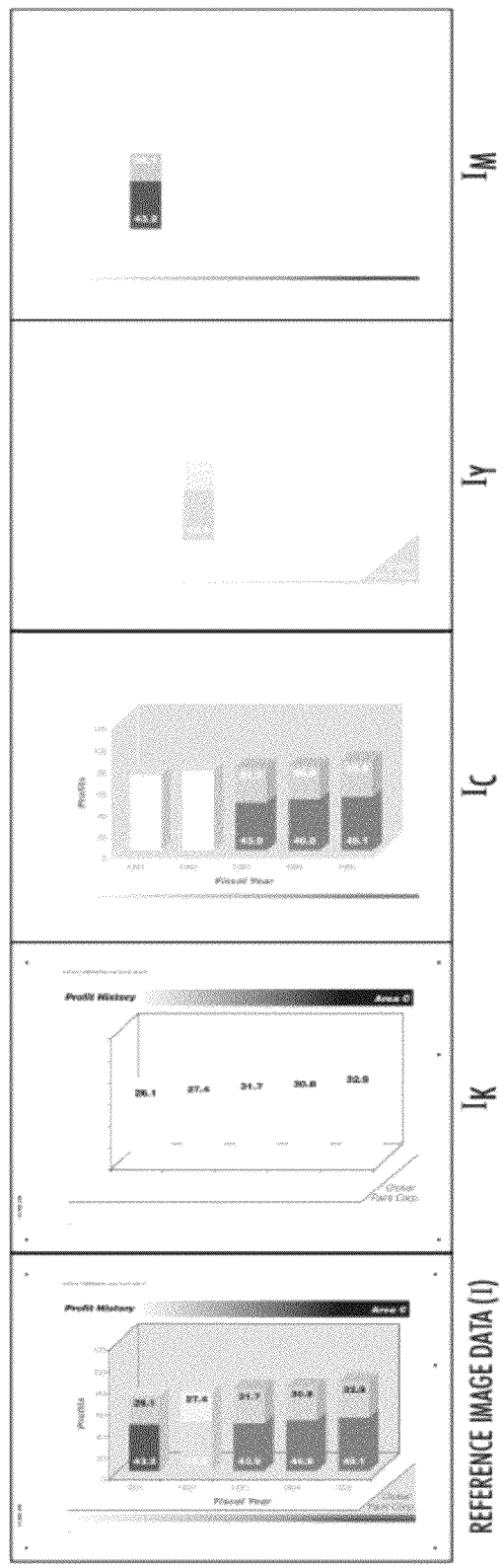
FIG. 8 shows the overall and individual generated reference image data for the color separations data for an exemplary relevant page on the image bearing surface, according to an embodiment.

FIG. 8 shows the overall and individual generated reference image data for the above-mentioned color separations data for an exemplary relevant page on the image bearing surface shown in FIG. 7, according to an embodiment. It shows the overall reference image data I on the image bearing surface corresponding to the relevant image. In additional, the individual generated reference image data of each color separation $I_K, I_C, I_Y, I_M$, are also shown.

Figure 9:
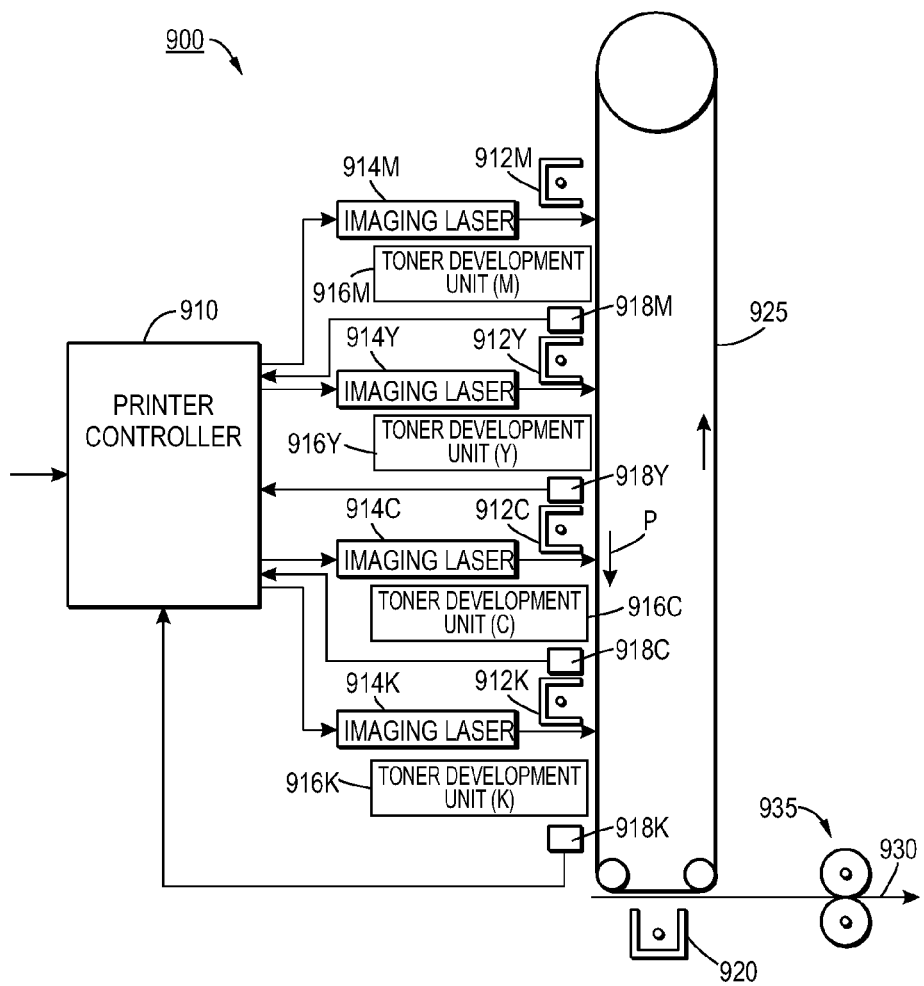
FIG. 9 shows an exemplary printing system, according to an embodiment.

FIG. 9 shows an exemplary embodiment of a printing system 900, according to another embodiment.

In some implementations, a plurality of color measuring devices 918K, 918C, 918Y, 918M may be installed at various locations on the image bearing surface 925, each corresponding to a respectively toner housing.

Each color measuring device 918K, 918C, 918Y, 918M may measure a single separation corresponding to one of the toner housing that it immediately follows. Thus, in this embodiment, each color separation may be captured by a single separate color measuring device. For example, the top layer of toner having been printed by the toner housing will be measured by the color measuring device associated with that toner.

Accordingly, the color separations data of the reference image I corresponding to the relevant page may be determined as follows:

1. All black (K) pixels, which correspond to K-pixels captured by the color measuring device 918K associated with the last toner housing, may be determined, as follows:

$$I_K(x, y) = R_K(x, y) + f(R_C(x, y), R_Y(x, y), R_M(x, y))$$
$$= 0 \text{ if } R_K(x, y) = 0$$

The black pixels may be modified by a correction function $f(\bullet)$ based on the likely impact of the cyan, yellow and magenta toners underneath.

2. All cyan (C) pixels, which correspond to C-pixels captured by the color measuring device 918C associated with the second to last toner housing, may be determined, as follows:

$$I_C(x, y) = R_C(x, y) + g(R_Y(x, y), R_M(x, y))$$
$$= 0 \text{ if } R_C(x, y) = 0$$

The cyan pixels may be modified by a correction function $g(\bullet)$ based on the likely impact of the yellow and magenta toners underneath.

All yellow (Y) pixels, which correspond to Y-pixels captured by the color measuring device 918Y associate with the third to last toner housing, may be determined, as follows:

$$I_Y(x, y) = R_Y(x, y) + h(R_M(x, y))$$
$$= 0 \text{ if } R_Y(x, y) = 0$$

The yellow pixels may be modified by a correction function $g(\bullet)$ based on the likely impact of the magenta toner underneath.

All magenta (M) pixels, which correspond to M-pixels captured by the color measuring device 918M associated with the fourth to last toner housing, may be determined, as follows:

$$I_M(x, y) = R_M(x, y)$$
$$= 0 \text{ if } R_M(x, y) = 0$$

The magenta pixels are the same as the raw input magenta pixels; and no modification is required.

5. The generated reference image of the sensed relevant page I may be defined as the combination of $I_C, I_M, I_Y, I_K$.

As indicated above, the color separations data may be modified by correction functions. If the top toner layer is completely opaque, the correction functions $f(\bullet), g(\bullet), h(\bullet)$ may be assumed to be all zeros (0). However, when the opacity is not complete, the correction functions may use fractional contributions of the bottom layers, so as to modify the color separation data, for example:

$$f(R_C(x,y), R_Y(x,y), R_M(x,y)) = aR_C(x,y) + bR_Y(x,y) + cR_M(x,y),$$

$$g(R_Y(x,y), R_M(x,y)) = aR_Y(x,y) + bR_M(x,y) \text{ and}$$

$$h(R_M(x,y)) = aR_M(x,y), \text{ where } |a|<1, |b|<1, \& |c|<1.$$

In one embodiment, the correction functions $f(\bullet), g(\bullet), h(\bullet)$ may be determined by offline experiments via imaging and measuring on the image bearing surface a set of test patches of pre-determined CMYK combinations. Other empirical methods and modeling are also possible.

Providing a color measuring device for each toner housing may impose significant costs, however, to the printing system. Thus, according to other embodiments, a plurality of color measuring devices may be provided, but less than the number of toner housings. For example, two color measuring device might be used, one located immediately after the black toner housing (for measuring black and cyan) and the other located immediately after the yellow toner housing (for measuring yellow and magenta).

As previously discussed, the reference image data of the color separations may be generated one-by-one starting with the color of the last toner housing relative to a particular color measuring device. Since this color is formed last on the image bearing surface (i.e., it is the top layer), it would not be covered or otherwise negatively impacted by other toner colors. Thus, the reference image data of color separation data for the color of the last toner housing may be the substantially the same as the raw data from the input image data for that color for all locations on the image bearing surface.

Next, the reference image data of the color of the second to last toner housing relative to that color measuring device may be inferred. The previous color may cover portions of the toner of this color on the image bearing surface. Thus, raw data for this color separation cannot be accurately measured with that color measuring device. According to an aspect of this application, sensing of this color separation at these pixels or locations may be suppressed, for example, fully or partially. Thus, in one implementation, the reference color separation data for color of the second to last housing relative to that color measuring device may include the raw data from the input image data for locations on the image bearing surface that were not covered by toner of the last color housing.

This process may be continued for the additional toner colors, by generating the reference image data for each additional color separation on the image bearing surface from the raw data that are covered by toner colors that have previously been considered, the housing order and the locations of color measuring devices.

Figure 10:
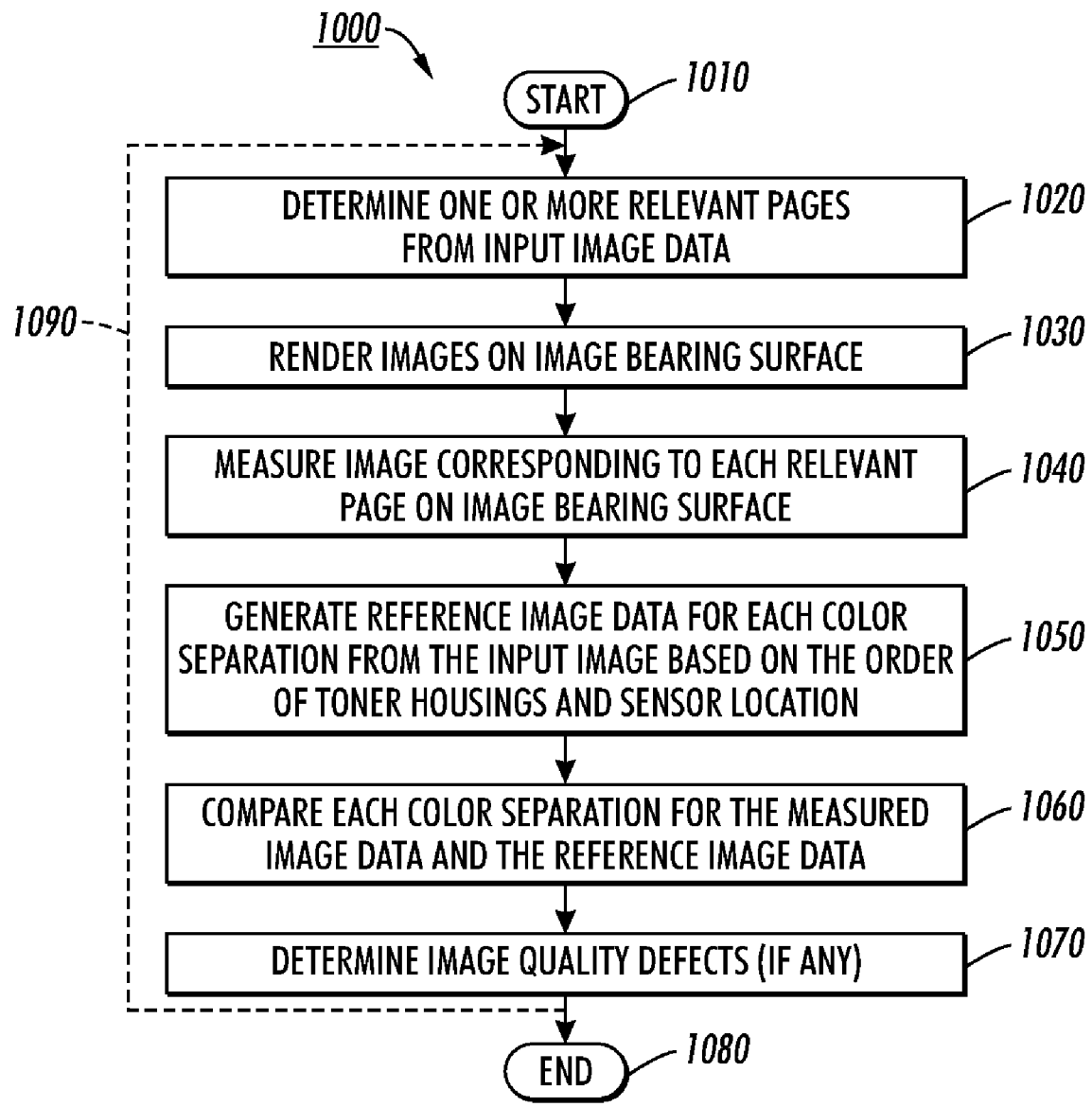
FIG. 10 is a flowchart outlining an exemplary method, according to an embodiment.

FIG. 10 is a flowchart outlining an exemplary method, according to an embodiment.

As shown in FIG. 10, the process begins in step 1010. In step 1020, the system identifies one or more relevant pages in the document (or documents) that can provide useful information about the state of the printing system. The relevant pages and non-relevant pages are each rendered by the marking engine.

Next, in step 1030, the system prints images on an image bearing surface which includes the one or more relevant pages. A plurality of toner housings may be provided, for applying toner of different colors to the image bearing surface.

In step 1040, one or more color measuring devices measure each of the images on the image bearing surface corresponding to the relevant pages.

Next in step 1050, reference image data for color separations may be generated by the image analyzer based on the input image data, the order of the toner housing and the locations of color measuring devices. As discussed above, the order of the toner housings relative to the color measuring devices may be important.

In step 1060, a comparison may be made between the reference image data for each color separation and its corresponding measured unfused image data for the relevant pages. For example, the black pixels (K) are compared, the cyan pixels (C) are compared, the yellow pixels (Y) are compared; and the magenta (M) pixels are compared. If more process colors are used, those color separations colors may similarly be compared in this manner.

In step 1070, one or more image quality defects (if any) may be determined. In some implementations, alerts may be issued, and/or remedial action taken in response thereto.

The process may end in step 1080, or alternatively it may repeat one or more times via path 1090, as desired, for example, for additional documents.

While this disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the disclosure following, in general, the principles of the disclosure and including such departures from the present disclosure as come within known or customary practice in the art to which the disclosure pertains, and as may be applied to the essential features hereinbefore set forth and followed in the spirit and scope of the appended claims.

What is claimed is:

1. A system configured for analyzing all or selected images printed on an image bearing surface of a printing device, the system comprising:
a marking system comprising: (i) a toner application system comprising at least two toner housings for applying toner to develop an unfused image on the image bearing surface corresponding to pages of the document, and (ii) a system for transferring and fusing the toner to a target media;
one or more color measuring devices positioned adjacent to the image bearing surface up stream of the transferring and fusing systems and configured to measure the unfused image applied to the image bearing surface; and
an image analyzer configured to process input image data and the data from the color measuring device;
wherein the image analyzer comprises:
a reference image generator configured to calculate electronic reference image data based on input image data, a sequence of the toner housings, and location of the one or more color measurement devices; and
a comparator configured to process the data from the color measuring device and compare it with the calculated reference image data.

2. The system according to claim 1, further comprising:
a relevant pages selector configured to process input image data and select relevant pages of the input image data, which meet predetermined criteria to provide information regarding a state of the printing device; and
an image defect detector configured to process the output of the comparator for detecting at least one type of the image quality defect.

3. The system according to claim 1, wherein the reference image generator calculates electronic reference image data based on the image data of the topmost toner layer at a given pixel or image location, modified by image data corresponding to the lower toner layers at the same pixel or image location.

4. The system according to claim 2, wherein the image defect detector is configured to request a reprint of any page if a desired parameter is not achieved.

5. The system according to claim 1, wherein the one or more color measuring devices includes one of: a digital scanner, full width array (FWA) sensor or two-dimensional array sensor.

6. The system according to claim 1, wherein the comparison is: pixel-by-pixel, by groups of pixels, or by location.

7. The system according to claim 3, wherein modified by image data corresponding to the lower toner layers at the same pixel or image location is based on an effective transparency of the upper toner layers at that pixel or image location.

8. The system according to claim 7, wherein the effective transparency is substantially zero and the modification is none.

9. The system according to claim 7, wherein the effective transparency of the upper toner layers at that pixel or image location is determined empirically.

10. A method for analyzing all or selected images printed on an image bearing surface of a printing device, the method comprising:
applying toner from at least two toner housings to develop an unfused image on the image bearing surface corresponding to pages of the document;
transferring and fusing the toner to a target media;
measuring the unfused image applied to the image bearing surface with one or more color measuring devices;
analyzing the input image data and the measured image data;
calculating electronic reference image data based on input image data, a sequence of the toner housings, and location of the one or more color measurement devices; and
comparing the measured image data with the calculated reference image.

11. The method according to claim 10, further comprising:
processing input image data to determine relevant pages of the document to be printed, which meet predetermined criteria to provide information regarding a state of the printing device; and
detecting at least one type of image quality defect based on the comparison.

12. The method according to claim 10, further comprising:
calculating electronic reference image data based on the image data of the topmost toner layer at a given pixel or image location, modified by image data corresponding to the lower toner layers at the same pixel or image location.

13. The method according to claim 11, further comprising:
requesting a reprint of any page if a desired parameter is not achieved.

14. The method according to claim 10, wherein measuring the unfused image further comprises using one of: a digital scanner, full width array (FWA) sensor or two-dimensional array sensor.

15. The method according to claim 10, further comprising:
comparing image data pixel-by-pixel, by groups of pixels, or by location.

16. The method according to claim 12, wherein:
modifying the image data corresponding to the lower toner layers at the same pixel or image location is based on an effective transparency of the upper toner layers at that pixel or image location.

17. The method according to claim 16, wherein the effective transparency is substantially zero and the modification is none.

18. The method according to claim 16, further comprising:
determining empirically the effective transparency of the upper toner layers at that pixel or image location.

* * * * *